United States Patent
Audy

(10) Patent No.: US 8,129,972 B2
(45) Date of Patent: Mar. 6, 2012

(54) SINGLE INTEGRATOR SENSORLESS CURRENT MODE CONTROL FOR A SWITCHING POWER CONVERTER

(75) Inventor: Jonathan Mark Audy, Los Gatos, CA (US)

(73) Assignee: Analog Devices, Inc, Norwood, MA (US)

( * ) Notice: Subject to any disclaimer, the term of this patent is extended or adjusted under 35 U.S.C. 154(b) by 761 days.

(21) Appl. No.: 12/290,506

(22) Filed: Oct. 31, 2008

(65) Prior Publication Data

US 2009/0146634 A1    Jun. 11, 2009

Related U.S. Application Data

(60) Provisional application No. 61/005,602, filed on Dec. 5, 2007.

(51) Int. Cl.
    *G05F 1/00* (2006.01)
(52) U.S. Cl. ........................................ 323/285
(58) Field of Classification Search .......... 323/282, 323/284, 285, 286
    See application file for complete search history.

(56) References Cited

U.S. PATENT DOCUMENTS

| 6,894,471 B2 * | 5/2005 | Corva et al. | 323/282 |
| 2005/0017703 A1 * | 1/2005 | Walters et al. | 323/288 |

OTHER PUBLICATIONS

Midya, Pallas et al.; "Sensorless Current Mode Control-An Observer-Based Technique for DC-DC Converters"; IEEE Transactions on Power Electronics, vol. 16; No. 4; Jul. 2001; pp. 522-526.

* cited by examiner

*Primary Examiner* — Harry Behm
*Assistant Examiner* — Matthew Grubb
(74) *Attorney, Agent, or Firm* — Koppel, Patrick, Heybl & Philpott

(57) ABSTRACT

A single integrator sensorless current mode control scheme for a switching power converter requires an amplifier circuit which produces an first current that varies with the difference $V_{error}$ between a reference voltage and a voltage that varies proportionally with $V_{out}$, a circuit which produces a second current that varies with the voltage $V_L$ across the output inductor, a single integrating element connected to receive the first and second currents such that it integrates both $V_{error}$ and $V_L$, and a comparator which receives the integrated output at its first input and a substantially fixed voltage at its second input and produces an output that toggles when the voltage at its first input increases above and falls below the substantially fixed voltage. The comparator output is used to control the operation of the power converter's switching circuit and thereby regulate the output voltage.

26 Claims, 5 Drawing Sheets

SINGLE INTEGRATOR SENSORLESS CURRENT MODE CONTROL FOR A SWITCHING POWER CONVERTER

RELATED APPLICATIONS

This application claims the benefit of provisional patent application No. 61/005,602 to Jonathan Mark Audy, filed Dec. 5, 2007.

BACKGROUND OF THE INVENTION

1. Field of the Invention

This invention relates generally to switching power converters, and more particularly, to a sensorless current mode control method for such a converter.

2. Description of the Related Art

Switching power converters require feedback to regulate their output, and as such they typically require frequency compensation in order to guarantee stability. To this end, various switching power converter controller architectures have been developed with different compensation requirements, which provide different levels of performance with respect to stability and transient response.

Three of the most common controller architectures are categorized as follows:
1) Voltage mode
2) Voltage mode with input voltage feed-forward
3) Current mode (with voltage mode)

Each has advantages and disadvantages. Voltage mode is relatively easy to implement, but harder to compensate and typically does not provide as good a transient performance as current mode. Voltage mode with input voltage feed-forward provides better input line rejection, albeit not as good as current mode, as the instantaneous correction provided by input voltage feed-forward is not an exact equivalent for the integrating nature of an inductor.

Although current mode controllers arguably provide the best overall performance, practical implementations of current mode can be troublesome and performance often falls short of theoretical. Ironically, the difficulties in implementing current mode typically preclude its use in higher frequency switching regulators. Although voltage mode controllers have a slower transient response, they are generally easier to operate at higher frequencies. Most high-frequency switching regulators on the market therefore employ voltage mode control. This results in these higher frequency voltage mode switching regulators ironically having slower transient responses than lower frequency current mode solutions.

Current mode controller performance must be traded-off with efficiency, since some series impedance is needed in the current path in order to sense current. For efficiency reasons, the voltage drop across this impedance is often designed to be very low, and hence this voltage signal is subject to significant noise. Another problem with current mode is settling time. When a switching converter's power switch is 'off', the voltage drop across it is very large. After the switch turns on, this voltage drops from very large to a very small value extremely rapidly. Inductive and capacitive stray effects can cause significant glitches immediately following this transition. These factors make current sensing in a switch difficult, due to the settling time needed. As an example, an 'off' switch may have 5V across it, and the same switch turned on with 0.5 amp flowing through it may only have 0.1 v of drop across it—and this is the full-scale signal. Usually a small fraction of the full-scale signal needs to be measured—a typical number being 0.02V.

Another issue with current mode control is that it typically requires an increase in the minimum operating voltage. This is because internally, the load current is replicated by a voltage signal. This replica signal rises and falls with the load current, therefore requiring a higher operating headroom voltage than would a voltage-mode controller. A converter that runs on a 3-5V supply voltage may need 0.5V of internal signal range for the replica of the inductor or switch current.

In order to mitigate some of these issues, a method called 'emulated current mode' is often used, typically in high duty ratio conditions where the current signal needs to be sensed during the shorter of the two switching periods. For example, in a step-down converter where peak current in the high-side switch is monitored and the input voltage is much larger than the output voltage, the on-time in the high-side switch is very short. In this example, emulated current mode would actually sense the true current during the low side conduction instead, when the inductor current is ramping down and the duration of the low-side on-time is long. This sensed signal is replicated as a proportional voltage onto a capacitor. At the end of the low-side on-time, this capacitor now contains the DC information about the inductor current. When the high-side switch turns on, instead of trying to measure the high-side switch current, the capacitor is charged by a current proportional to the inductor drive voltage. Thus, the capacitor voltage now emulates the high-side current, including the DC information, during the high-side on-time. The advantages of this over true current sensing are twofold: first, no settling time is needed, and second, because the capacitor is an integrator, it is by nature a noise filter. Also, any slight DC error during the emulation period is immediately removed on the next low-side on-time, so that DC errors do not accumulate on the capacitor.

SUMMARY OF THE INVENTION

A means of providing single integrator sensorless current mode control for a switching power converter is presented. The control method enables high frequency operation with an elegantly simple implementation, which is broadly applicable to a range of switching regulator types and architectures.

The present control method provides sensorless current mode (SCM) control for a switching power converter which includes a switching circuit that alternatively connects and disconnects an output inductor to and from a source voltage such that said output inductor conducts a current to an output terminal to produce an output voltage $V_{out}$. The control scheme requires:

an amplifier circuit which produces an first current that varies with the difference $V_{error}$ between a reference voltage and a voltage that varies proportionally with $V_{out}$;

a circuit which produces a second current which varies with the voltage $V_L$ across the output inductor;

a single integrating element connected to receive the first and second currents such that it integrates both $V_{error}$ and $V_L$; and a comparator which receives the integrated output of the integrating element at its first input and a substantially fixed voltage at its second input and produces an output that toggles when the voltage at its first input increases above and falls below the substantially fixed voltage. The comparator output is used to control the operation of the switching circuit, and thereby regulate $V_{out}$.

As an SCM controller, the present method does away with true current sensing, thereby eliminating the need for a compensated op amp current sense circuit; instead, the present controller utilizes a fully emulated current signal. This signal may be produced using, for example, a transconductance amplifier connected across the output inductor, or with a resistor connected between the switch node side of the output inductor and the integrating element.

The controller is arranged such that no DC information about the current sensing is maintained; therefore, the controller requires no additional voltage headroom to operate at higher load currents. As such, the present controller requires less voltage to operate than a traditional current mode controller.

Because the emulated current sense signal is 'integrated', it is essentially noise free, resulting in a signal-to-noise ratio which is typically many times better than that possible with true current mode (TCM) control. And due to the simple nature of the integration compared with true current sensing, operation at frequencies as high as those achieved using voltage mode control is made both possible and practical.

The present control scheme renders both high and low side current sensing equally trivial. This enables SCM control to easily implement architectures that are impractical with TCM control (e.g., hysteretic ripple current regulator).

The control method described herein can be used for a wide variety of switching regulator types and topologies, including but not limited to: feed-forward hysteretic ripple current step-down, constant on-time current mode step-down with input voltage feed-forward, constant frequency step-down with slope compensation, or step-up.

These and other features, aspects, and advantages of the present invention will become better understood with reference to the following drawings, description, and claims.

BRIEF DESCRIPTION OF THE DRAWINGS

FIG. 3b is a schematic of a hysteretic ripple current switching power converter which employs an SCM controller per the present invention which has been converted from the TCM controller of FIG. 3a.

DETAILED DESCRIPTION OF THE INVENTION

Figure 1A:
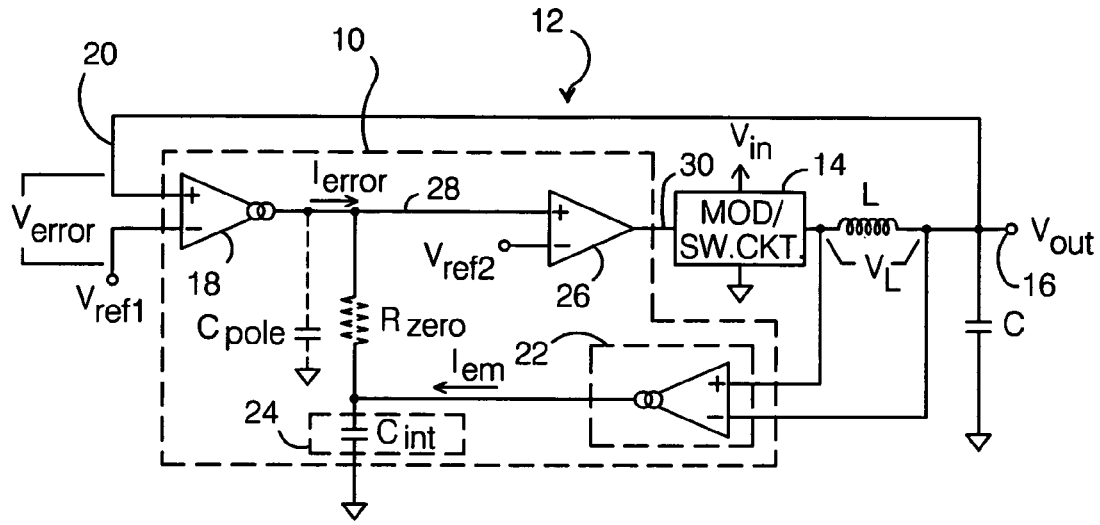
FIG. 1a is a schematic of one possible embodiment of a switching power converter which employs a single integrator SCM controller per the present invention.

Before describing the present single integrator SCM controller and control method, a background discussion of current mode operation is presented.

Current mode control typically requires the use of a current sense amplifier which is used to sense the current in the converter's output inductor. It is generally believed that the offset of the current sense amplifier should be minimized. However, this is only true for a few unique circumstances. For example, for normal "continuous conduction mode" (CCM) operation, the offset of the current sense amplifier is largely irrelevant. The unique circumstances where accurate DC information from the current sense amplifier is needed are:
1) Zero current: used for sensing the CCM/DCM (discontinuous conduction mode) boundary and providing true diode emulation. Zero current is a unique condition. When measuring the zero value of any given variable, errors in the gain on that variable are irrelevant. However, rather than employ true magnitude-accurate current sensing, a simple 'zero-crossing' comparator can be used for this function.
2) Current Limit: for keeping peak currents below destructive levels. At maximum current levels, offsets are less critical. This is the only place where DC magnitude-accurate current sensing matters. However, this is a 'fault-mode' condition, and as such is not used under normal operating conditions. Here again, a comparator can be used instead of an amplifier.

In a current mode controller, the current sense ramp is compared to the error amplifier output. Note that the 'error amplifier' is more accurately an 'error integrator', as it integrates any DC feedback error voltage as a rising (or falling) voltage at its output. The rate of change with time of the output voltage is proportional to the DC error on the input. An integrator output is devoid of any DC information and will adjust to any value it is tracking, regardless of any DC errors in the tracked quantity—namely the current sense signal.

For emulated current mode control, although the DC offset of the current sense amplifier is irrelevant to stability, cycle by cycle perturbations are very important. For example, if on one cycle the inductor current ramp is cut short, this information must be passed to the next cycle—it cannot be lost by the 'resetting' of a capacitor on each new cycle. To solve this issue, emulated current mode circuits do real current sensing on the longer part of the duty cycle, and then emulate on the short part of the cycle, where current sense settling time is an issue. In this way, the emulated current gets its DC information restored by the real current sensing on every cycle.

However, the recovery of DC information recovery is not necessarily required. As long as the loss of DC information in the current sense signal occurs slowly enough that it extends down to a lower frequency than the bandwidth of the error amplifier, then the switching regulator will never know this information was lost. If this criteria is met by a fully emulated current signal circuit, then it will behave exactly as a true current-sensing, current mode circuit. Therefore, emulating both the on-time and off-time (as well as dead time for DCM) should work well, as long as the rate of DC drift in the emulated (integrated) current replica signal is low enough.

But an integrator without an occasional reset will eventually wander. As such, an integrator (such as the error amplifier) cannot be directly compared to another integrator (such as a fully emulated current signal), because both integrators could slowly drift out to infinity. For digital control loops, this problem of an integrator drifting to infinity is easily handled mathematically, but in an analog circuit, this is a significant problem.

Overcoming this problem is an essential aspect of implementing fully emulated current mode control—which is more commonly referred to as 'sensorless current mode control' (SCM)—using analog circuits. For the present control scheme, rather than implementing a circuit which attempts to determine the difference between two integrators, a single integrating element—typically a capacitor—is shared between the two integrators in a combined manner, such that the two charging current sources sum into this single integrating device. The integrated output of this combining integrator can now be compared to a substantially DC voltage, i.e., with no frequency components that could adversely interact with the control loop, and whose value is chosen for convenience, ensuring that any long-term drifting problems are avoided; the DC signal is also convenient for providing operating headroom for the comparator and other controller circuits. Under the present control scheme, the controller's PWM comparator is servoing to a fixed DC value of no real significance; however, this is sufficient, as all the loop information is now contained in just one input of the comparator.

A schematic illustrating the basic principles of a single integrator SCM controller 10 per the present invention is shown in FIG. 1a. The controller serves as part of a switching power converter 12 which includes a modulator/switching circuit 14 (typically providing pulse-width modulation (PWM)), that alternatively connects and disconnects an output inductor L to and from a source voltage $V_{in}$ such that the output inductor conducts a current to an output terminal 16 to produce an output voltage $V_{out}$. The switching power converter would typically also include a filter capacitor C.

Controller 10 includes an amplifier circuit 18 which produces an first current $I_{error}$ that varies with the difference $V_{error}$ between a reference voltage $V_{ref1}$ and a voltage 20 that varies proportionally with $V_{out}$ (shown in FIG. 1a as $V_{out}$, though voltage 20 would typically be a divided down version of $V_{out}$). Controller 10 also includes a circuit 22 which produces a second current $I_{em}$ that varies with the voltage $V_L$ across output inductor L; thus, $I_{em}$ emulates the actual inductor current.

Controller 10 is arranged such that a single integrating element 24 receives both $I_{error}$ and $I_{em}$, such that it integrates both $V_{error}$ and $V_L$. A comparator 26 is connected to receive the integrated output 28 of single integrating element 24 at its first input (+) and a substantially fixed voltage $V_{ref2}$ at its second input (−), such that it produces an output 30 that toggles when integrated output 28 increases above and falls below $V_{ref2}$. Comparator output 30 is then used to control the operation of modulator/switching circuit 14, forming a control loop which operates to regulate output voltage $V_{out}$. Substantially fixed voltage $V_{ref2}$ can be any convenient value which results in reliable comparator operation. For example, $V_{ref2}$ can be provided by a diode-connected FET connected between the comparator's second input and a circuit common point, thereby making $V_{ref2}$ equal to the FET's gate-source voltage.

Single integrating element 24 is preferably a capacitor or capacitor network having a capacitance $C_{int}$. Amplifier 18 must perform a voltage-to-current conversion, and is suitably implemented with a transconductance amplifier. The circuit 22 which produces current $I_{em}$ must also perform a voltage-to-current conversion; it may be implemented with a transconductance amplifier as shown in FIG. 1a, though other possible implementations are described below. Because the present scheme does not sense the current in output inductor L, but rather the voltage across L, it is referred to herein as a "sensorless" current mode (SCM) control method.

The present controller typically requires a means of providing frequency compensation. One way in which this can be provided is with a compensation resistance $R_{zero}$ connected between integrating element 24 and the output of amplifier 18. $R_{zero}$ serves to provide a 'zero' in the controller's frequency response, thereby establishing a finite gain roll-off at higher frequencies, which may be necessary in order to provide enough phase margin at the unity-gain frequency. By feeding emulated current $I_L$ into integrating element 24 after compensation resistance $R_{zero}$, as shown in FIG. 1a, both integrated signals are combined together in one output (28) at the top of the 'zero' resistor. For additional control of the loop response rolloff, a capacitor having a capacitance $C_{pole}$ is preferably connected across $R_{zero}$ as shown.

Figure 1B:
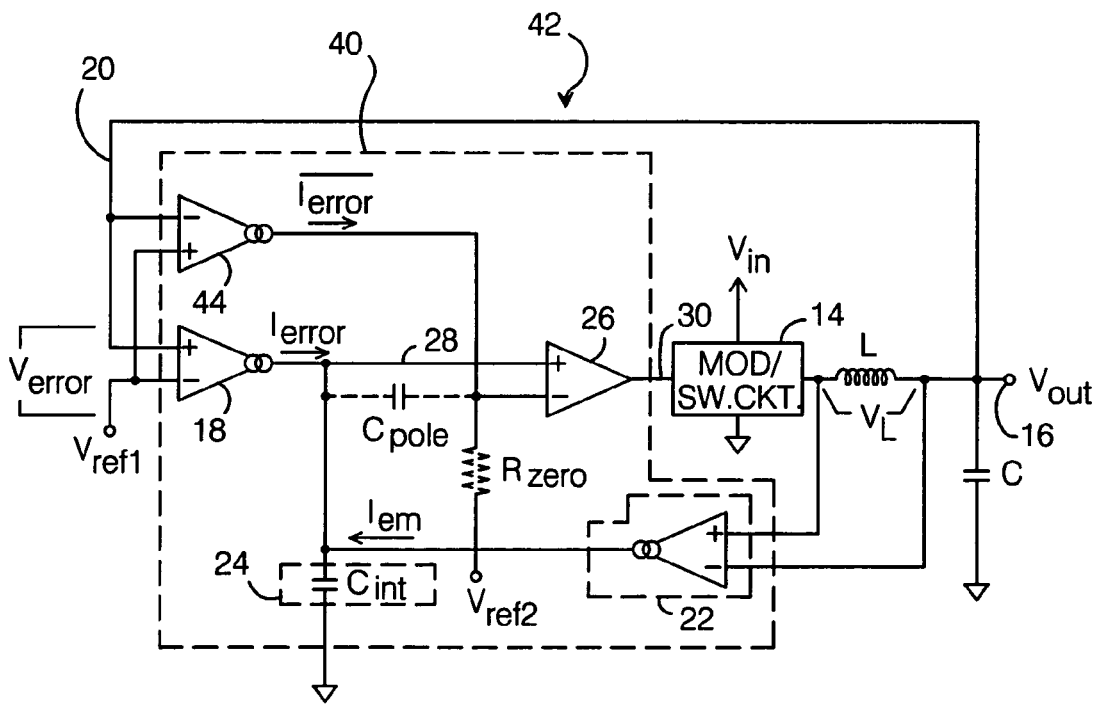
FIG. 1b is a schematic of another possible embodiment of a switching power converter which employs a single integrator SCM controller per the present invention.

One possible alternative arrangement of a controller 40 for a switching power converter 42 is shown in FIG. 1b. Here, compensation resistance $R_{zero}$ is connected between the second input (−) of comparator 26 and substantially fixed voltage $V_{ref2}$, and $C_{pole}$ connects from the top of $C_{int}$ to the top of $R_{zero}$. When $R_{zero}$ is located as shown in FIG. 1b, the top of $R_{zero}$ should be driven with a current $\overline{I_{error}}$, generated using, for example, a second transconductance amplifier 44 having its inputs connected opposite those of amplifier 18, or by arranging amplifier 18 such that it provides non-inverting and inverting outputs.

Figure 2A:
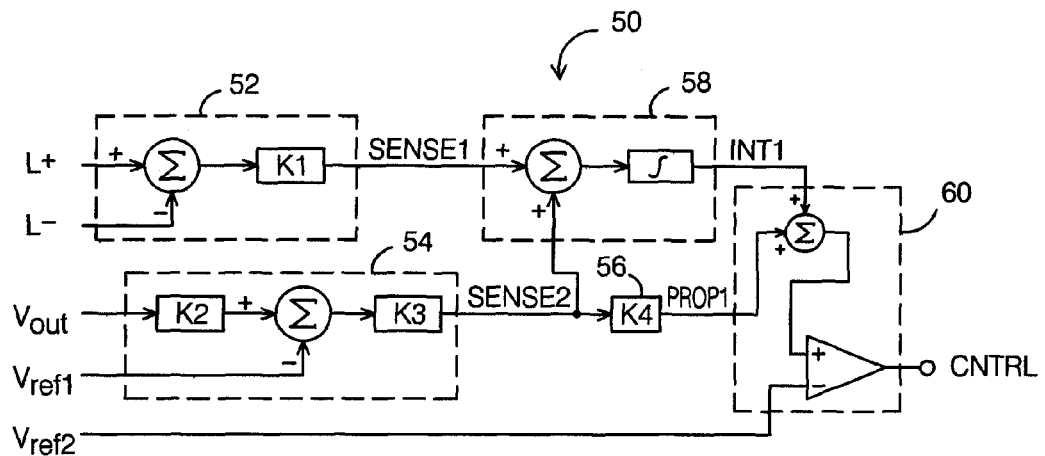
FIG. 2a is a mathematical representation of one possible implementation of a single integrator SCM control method per the present invention.

A mathematical representation of the present control scheme is shown in FIG. 2a, which correlates with the controller implementation shown in FIG. 1a. The control scheme 50 includes a first signal processing block 52 which produces an output SENSE1 given by:

SENSE1=(L+−L−)*K1, where (L+−L−) is the voltage across output inductor L and K1 is a first gain factor.

The scheme also includes a second signal processing block 54 which produces an output SENSE2 given by:

SENSE2=($V_{out}$*K2−$V_{ref1}$)*K3, where K2 and K3 are second and third gain factors, respectively, and $V_{ref1}$ is a reference voltage.

A third signal processing block 56 produces an output PROP1 given by:

PROP1=SENSE2*K4, where K4 is a fourth gain factor.

A fourth signal processing block 58 produces an output INT1 given by:

INT1=ƒ(SENSE1+SENSE2).

Finally, a fifth signal processing block 60 produces the control scheme's output CNTRL, given by:

CNTRL=INT1+PROP1−$V_{ref2}$, where $V_{ref2}$ is a substantially fixed voltage. The CNTRL output is used to control the operation of the converter's switching circuit.

In practice, first signal processing block 52 may comprise, for example, a transconductance amplifier having a gain K1, and second signal processing block 54 may comprise, for example, a resistive divider which multiples $V_{out}$ by gain factor K2, and a transconductance amplifier having a gain K3. Third signal processing block 56 preferably comprises a compensation resistor ($R_{zero}$) which multiplies the SENSE2 output of second signal processing block 54 by fourth gain factor K4, and fourth signal processing block 58 preferably comprises a single capacitor connected to a node at which SENSE1 and SENSE2 are summed. Fifth signal processing block 60 preferably comprises a summation node at which INT1 and PROP1 are summed, and a comparator which is connected to the summation node at a first input and to voltage $V_{ref2}$ at a second input.

Figure 2B:
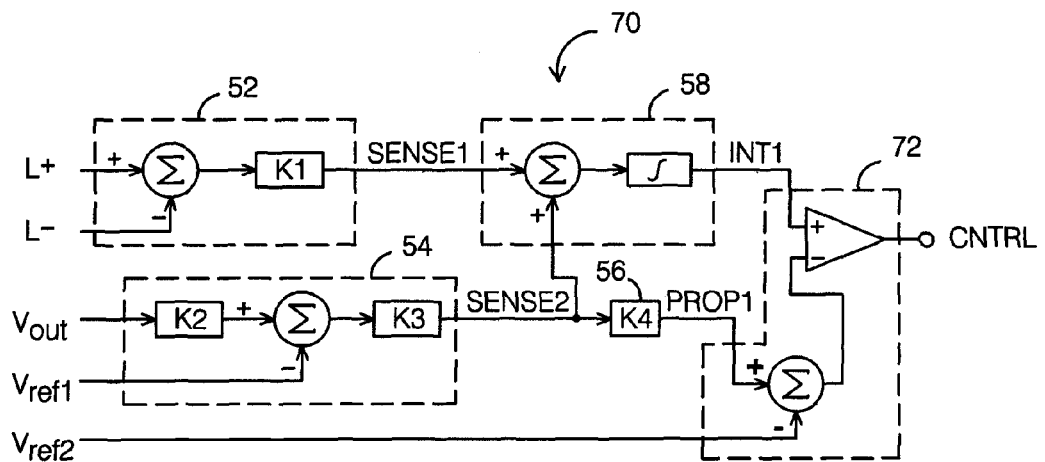
FIG. 2b is a mathematical representation of another possible implementation of a single integrator SCM control method per the present invention.

A mathematical representation of the present control scheme which corresponds to the controller implementation of FIG. 1b is shown in FIG. 2b. The control scheme 70 includes first, second, third and fourth signal processing blocks 52, 54, 56, 58 which produce outputs SENSE1, SENSE2, PROP1 and INT1, respectively, as described above. The alternative location of compensation resistance $R_{zero}$ is reflected in the fifth signal processing block 72, in which output CNTRL is given by:

$$CNTRL = V_{ref2} - PROP1 + INT1,$$

where $V_{ref2}$ is a substantially fixed voltage.

True current sense amplifiers are typically not that accurate with respect to gain (magnitude) or gain linearity. Similarly, the accuracy of the emulated current is not particularly critical, but there are some differences: the emulated current signal needs to operate on both the 'on' and 'off' pulses used to drive the switching circuit, in order to maintain low frequency information and perturbations past the cut-off bandwidth of the error amplifier. Reasonable matching between ramp up gain and the ramp down gain is required; otherwise the error amplifier has to recover the difference with a net DC output, which results in a net DC offset at its input.

There are numerous benefits associated with the present control scheme. For example, the scheme eliminates the need for a compensated op amp current sense circuit. Also, because no DC information about the current sensing is maintained, there is no additional voltage headroom required to operate at higher load currents: for all load currents, the circuit operates around the same DC reference value. The SCM control circuit therefore requires less voltage to operate than a traditional current mode controller. Furthermore, because the emulated current sense signal is 'integrated', it is essentially noise free. Signal-to-noise ratio for the method is typically many times greater than that achievable with TCM control.

The present method also makes very high frequency operation both possible and practical, due to the simple nature of the integration compared with true current sensing (particularly when the current sensing is in the switches); in fact, SCM control can operate at frequencies rivaling those achieved using voltage mode control. Also, high side and low side current sensing are equally trivial, which makes implementing architectures that are impractical with TCM control (for example: hysteretic ripple current regulator) relatively easy.

The present control scheme can also simplify the testing of production parts. Because the current sense is fully emulated and independent of the inductor value and current, full switching waveforms can be tested using an inductor having a high inductance combined with a lower output capacitance such that the corresponding actual inductor ripple current is low when being tested, with an output ripple voltage equivalent to that which would be present with a smaller inductance and larger capacitance as is typically used in actual application circuits. The ability to use a high-valued inductor which provides a low ripple current is of benefit because during testing, there are significant parasitic series resistances due to the lengthy connections to the chip being tested, and these would dramatically distort, or even prevent, operation under larger currents. For this reason, most conventional switching regulators are never tested with an actual inductor.

It should also be noted that a controller as described herein can operate at a frequency that is inductor-independent; i.e., changes in inductor value will not change the operating frequency of ripple-type regulators, which will behave more like constant frequency regulators. The present controller is also less sensitive to low-slope current sense signals, due to the scheme's integrating nature.

Slope compensation is a significant drawback of traditional fixed frequency current mode architectures. Another benefit of the present control method is that slope compensation can be accurately tuned independent of the inductor value.

Figure 3A:
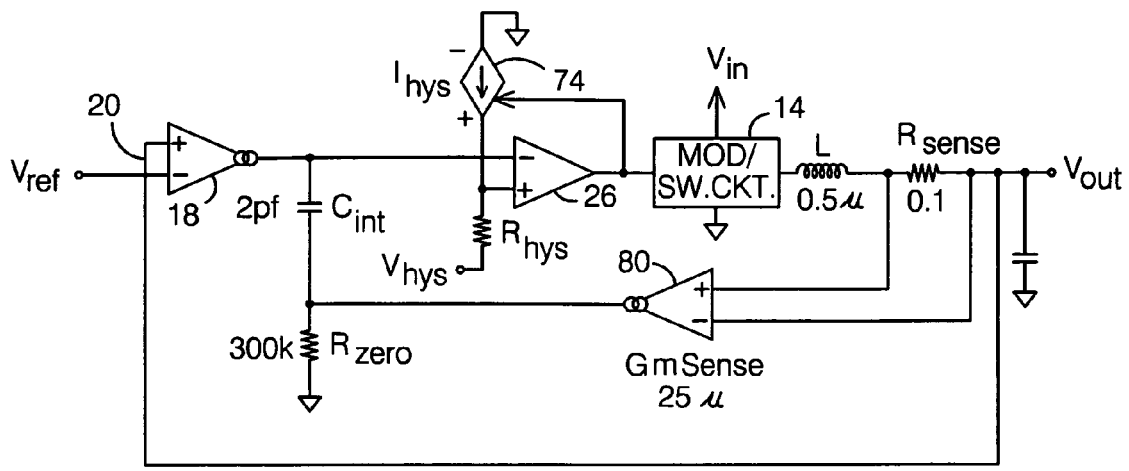
FIG. 3a is a schematic of a hysteretic ripple current switching power converter which employs a TCM controller.

Existing voltage-mode and current-mode architectures are easily converted to the new method. As an example, a hysteretic ripple current switching power converter that uses TCM control is shown in FIG. 3a. In operation, assuming $V_{hys}$ is, for example, 1 volt, when the output of amplifier 18 falls below 1 volt, the output of the comparator goes high and turns on a switchable current source 74 which outputs a current $I_{hys}$ (=2 µA in this example) when on, which raises the voltage at the comparator's+input to ~1.6 volts (1+0.2µ*300 k). When the output of amplifier 18 increases above ~1.6 volts, the output of the comparator goes low. This regulator architecture is known for its excellent stability in terms of phase margin; however, it is difficult to implement by sensing the switch resistance, as both the high-side and low side currents must be sensed. Because the ripple current is the controlled variable, any mismatch in the high and low side current sense amplifiers would result in a significant frequency variation, to the point that it is impractical to implement. Therefore, the most practical method for implementing this architecture is to add a sense resistor having a resistance $R_{sense}$ in series with the inductor as shown in FIG. 3a. A voltage-to-current converter 80 having a transconductance GmSense is connected across $R_{sense}$, and its output is delivered into the compensation network resistance $R_{zero}$, which is connected in series with an integration capacitance $C_{int}$. Unfortunately, the use of $R_{sense}$ necessarily adds to the converter's losses, as well as adding costs due to the addition of the low-valued sense resistor. In this example, $R_{sense}$ is 0.1Ω, $R_{zero}$ is 300 kΩ, $C_{int}$ is 2 pf, L is 0.5 µH, and GmSense is 25 µA/V.

To convert the TCM controller to a SCM controller as described herein, two modifications are made to the schematic of FIG. 3a:

1) the $C_{int}$ and $R_{zero}$ component locations are swapped. This allows $C_{int}$ to be the integrator for both the error amplifier (18) and the emulated current mode signal, without altering the information carried by $R_{zero}$.

2) the current sense V-to-I converter drops in gain dramatically, and its inputs are moved such that it now senses the inductor drive voltage instead of the voltage drop across a current sense resistor.

Before the TCM controller of FIG. 3a can be converted to SCM control, an equivalent 'ramp-rate' (dV/dT) calculation is needed to determine appropriate component values. For the same compensation components, the internal ramp-rate of the TCM signal must be replicated in the SCM controller, so that the inductor ripple current is the same. The TCM controller will have a signal gain i-to-v, whereby an internal ripple voltage will be generated based on the inductor ripple current in the sense resistor.

To perform the conversion, the following TCM controller values must be known:

$R_{sense}$—the resistance of the current sense resistor;
GmSense—the transconductance of the current sense amplifier; and
$R_g$—the resistance into which the output of the current sense amplifier is turned back into a voltage. Note that Rg can also be the 'zero' resistance '$R_{zero}$' in the compensation network.

With these quantities known, a TCM controller can be readily converted to an SCM controller The dV/dT equations for both the TCM and SCM controller are equated, in order to ensure the internal 'replicas of the inductor current' are of equal magnitude.

Bear in mind that the SCM controller does not depend on the inductor value to set the frequency, so if the inductor is later changed, the SCM controller will not vary its frequency like the TCM controller will; however, there will be an 'inductor current gain error' that will change the effective compensation, and this should be designed to be within tolerance.

The rate of change of the sensed voltage is given by:

TCM:
$$\frac{dV}{dT} = \left(\frac{V_L}{L} R_{sense}\right) \cdot GmSense \cdot R_g, \text{ and}$$

SCM:
$$\frac{dV}{dT} = \frac{V_L \cdot GmScm}{C_{int}},$$

where $V_L$ is the voltage across the output inductor, which has inductance L, GmScm is the transconductance of the V-to-I converter connected across the SCM controller's output inductor, and $C_{int}$ is the capacitance of the SCM controller's integrating element.

Equate and solve:
For converting TCM to SCM:

$$GmScm = \frac{GmSense \cdot C_{int} \cdot R_{sense} \cdot R_g}{L}$$

For reference, to convert from an SCM design to a TCM design:

$$GmSense = \frac{GmScm \cdot L}{C_{int} \cdot R_{sense} \cdot R_g}$$

Thus, for the example above, to set up the SCM controller:

$$GmScm = \frac{25\,\mu \cdot 2pf \cdot 0.1\Omega \cdot 300\,k\Omega}{0.5\,\mu H} = 3\,\mu A/V$$

Figure 3B:
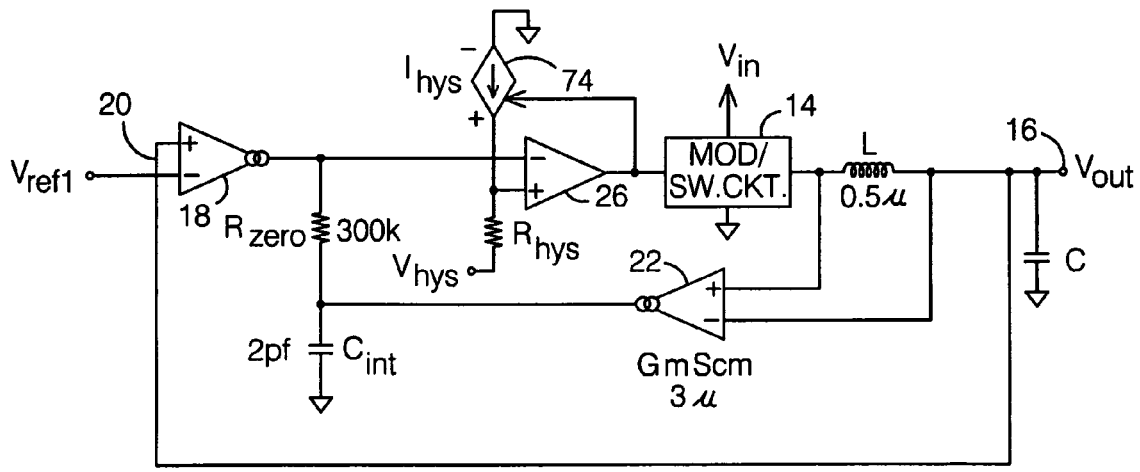

A schematic of the resulting SCM controller is shown in FIG. 3b.

Figure 4:
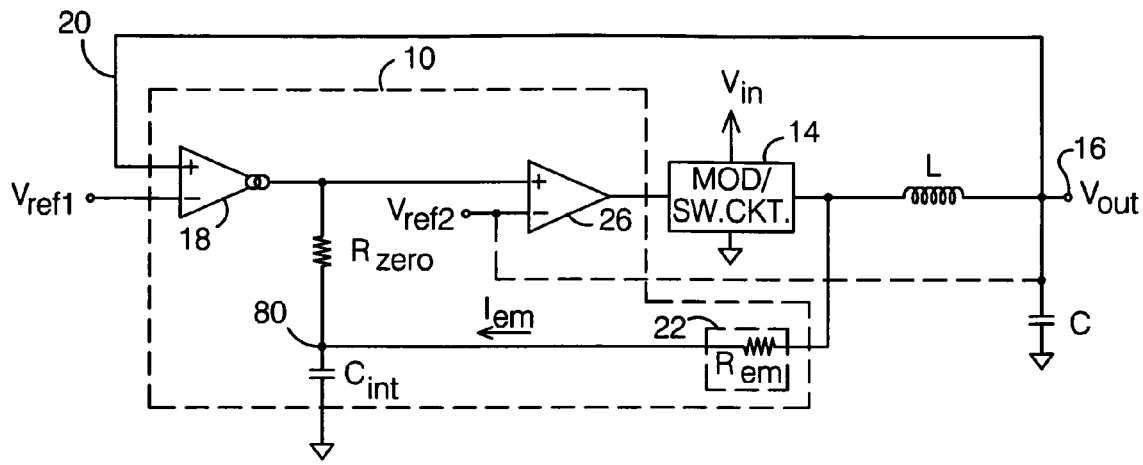
FIG. 4 is a schematic of another possible embodiment of a switching power converter which employs a single integrator SCM controller per the present invention.

Another possible embodiment of a controller per the present invention is shown in FIG. 4. Here, the circuit 22 which produces the current $I_{em}$ that varies with voltage $V_L$ across output inductor L is implemented with a resistor having a resistance $R_{em}$, which also operates as a voltage-to-current converter. To ensure that $I_{em}$ accurately emulates the inductor current, the voltage across $R_{em}$ should be equal to that across output inductor L. Since $R_{em}$ is connected to the switch node side of L, this can be arranged by forcing node 80 at the junction of $R_{zero}$ and $C_{int}$ to be equal to the voltage on the output terminal side of L—i.e., $V_{out}$. This can be achieved by connecting the second input (−) of comparator 26 to $V_{out}$, rather than to a fixed reference voltage. When so arranged, an appropriate value for $R_{em}$ can be calculated as follows:

$$R_{em} = 1/GmScm,$$

where GmScm is calculated as described above. In the example above, GmScm was calculated to be 3 uA/V. Therefore, the appropriate value for $R_{em}$ for this example is given by $R_{em} = \frac{1}{3}u = 333\,k\Omega$.

Figure 5:
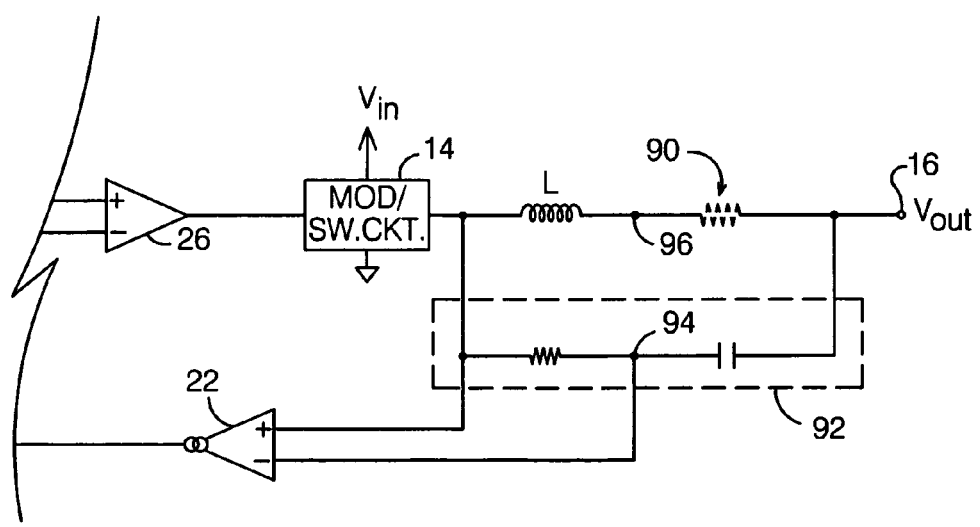
FIG. 5 is a schematic of an R-C filter that might be used with a single integrator SCM controller per the present invention.

It can be observed that the output voltage $V_{out}$ of the sensorless hysteretic ripple current regulator of FIG. 3b is about 1 mV lower than that of the TCM regulator of FIG. 3a. As illustrated in FIG. 5, the reason for this is that the inherent resistance 90 of the output inductor produces a DC offset in the emulation current, and this in turn skews the up/down ramp ratio, giving a net offset at the output. If extreme DC accuracy is required, this error term can be easily removed by connecting a low-pass R-C filter 92 across the inductor as shown in FIG. 5; the filter can easily be integrated. To compensate for the offset, the filter should be arranged such that the voltage at node 94 at the R-C junction is made equal to the voltage that would be present across inductor L in the absence of resistance 90 (represented as node 96 in FIG. 5).

Figure 6:
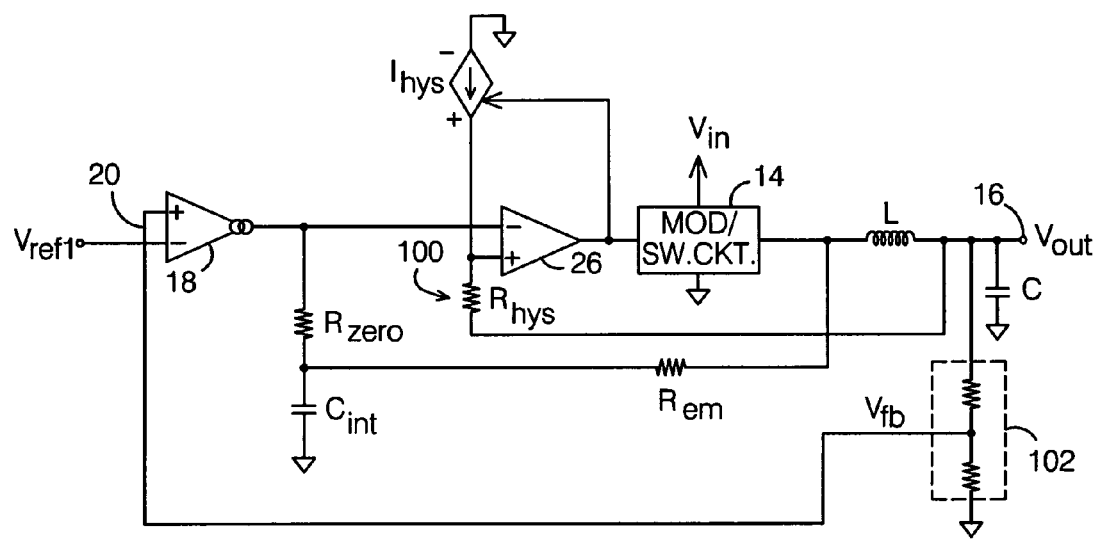
FIG. 6 is a schematic of one possible embodiment of a hysteretic ripple current mode switching power converter which employs a single integrator SCM controller per the present invention.

In any switching regulator, there are two methods for changing $V_{out}$. Most commonly, $V_{out}$ is divided down with a potential divider network, and the reduced voltage ($V_{fb}$) is fed back to amplifier 18 as voltage 20; this is illustrated in FIG. 6. Here, changing the divider ratio alters $V_{out}$. Alternatively, the reference voltage ($V_{ref1}$ in the embodiments described above) can be gained up to equal the desired output voltage. The second method has a far better signal-to-noise ratio, as a fixed DC value is gained up rather than having a feedback signal which is attenuated down, but this method may result in input voltage headroom issues that need to be considered in the design of the controller.

In the SCM controller shown in FIG. 6, it is important that the reference voltage on the end of the hysteresis resistor 100 equals $V_{out}$. This can be ensured by tying resistor 100 directly to $V_{out}$ instead of to an internal reference signal. This preferred arrangement ensures that the emulation current in $R_{em}$ mimics the inductor drive voltage.

As noted above, the control method described herein can be used for a wide variety of switching regulator types and topologies. This includes all current mode control methods, including but not limited to: a feed-forward hysteretic ripple current step-down converter, a constant on-time current mode step-down converter with input voltage feed-forward, a constant frequency step-down switching power converter with slope compensation, or a step-up converter.

The present method provides advantages over prior art schemes for many of these topologies. For example, for a constant frequency buck regulator with slope compensation, slope compensation is a requirement for stability. The amount of slope compensation should ideally be equal to somewhere between 50% to 100% of the down-slope of the inductor current. Exactly 50% gives perfect line transient regulation, while exactly 100% kills inductor current perturbations perfectly in one cycle (dead-beat). A significant issue with slope compensation is that if it is not 'tuned' to the inductor value and output voltage, it can cause more harm than good. Of course, there is no intrinsic matching between an external inductor and an internal R-C based integrator. This is where a SCM controller as described herein has a great advantage: the slope compensation is tuned to the emulated current waveform, which is also based on internal R-C components. This gives perfect matching and is independent of the external inductor value.

Due to its simple implementation nature, the single integrator SCM method provides the ability to implement current mode operation at frequencies comparable to those used by voltage mode converters. When used in, for example, a ripple regulator topology, the resulting converter offers superior performance for portable power applications, providing very rapid transient response, superb noise immunity, and automatic discontinuous mode operation for light loads.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

I claim:

1. A single integrator sensorless current mode (SCM) controller for use with a switching power converter which includes a switching circuit that alternatively connects and disconnects an output inductor to and from a source voltage such that said output inductor conducts a current to an output terminal to produce an output voltage $V_{out}$, comprising:
   an amplifier circuit which produces a first current that varies with the difference $V_{error}$ between a reference voltage and a voltage which varies proportionally with $V_{out}$;
   a circuit which produces a second current that varies with the voltage $V_L$ across said output inductor;
   a single integrating element connected to receive said first and second currents such that it integrates both $V_{error}$ and $V_L$; and
   a comparator which receives the integrated output of said single integrating element at its first input and produces an output that toggles when the voltage at its first input increases above and falls below the voltage at its second input, said comparator output arranged to control the operation of said switching circuit.

2. The controller of claim 1, wherein said single integrating element is a capacitor.

3. The controller of claim 1, wherein said amplifier circuit is a transconductance amplifier.

4. The controller of claim 1, wherein said circuit which produces said second current is a transconductance amplifier, the inputs of which are connected across said output inductor.

5. The controller of claim 1, wherein said output inductor is connected between said output terminal and a switch node, said controller arranged such that said circuit which produces said second current comprises a resistance connected between said switch node and said integrating element.

6. The controller of claim 1, wherein the voltage at said comparator's second input is a substantially fixed voltage.

7. The controller of claim 6, wherein said substantially fixed voltage is $V_{out}$.

8. The controller of claim 1, wherein the voltage at said comparator's second input is a hysteretic voltage, said controller arranged such that said hysteretic voltage toggles up and down with said comparator output.

9. The controller of claim 1, wherein the output of said amplifier circuit is connected to a first node, the output of said circuit which produces said second current is connected to a second node, and said integrating element is connected between said second node and a circuit common point;
   further comprising a compensation resistance connected between said first and second nodes.

10. The controller of claim 9, further comprising a pole capacitance connected between the output of said amplifier circuit and a circuit common point, said pole capacitance selected so as to obtain a desired loop response rolloff for said controller.

11. The controller of claim 1, wherein said amplifier circuit is arranged to produce said first current which varies with the difference $V_{error}$ between a reference voltage and a voltage that varies directly with $V_{out}$, and a third current which is an inverted version of said first current, said controller arranged such that said third current is delivered to said comparator's second input;
   further comprising a compensation resistance connected between said comparator's second input and a substantially fixed voltage.

12. The controller of claim 11, further comprising a pole capacitance connected between the output of said amplifier circuit and said comparator's second input, said pole capacitance selected so as to obtain a desired loop response rolloff for said controller.

13. The controller of claim 1, wherein said output inductor is connected between said output terminal and a switch node, said circuit which produces said second current comprising:
   a resistance connected between said switch node and an intermediate node;
   a capacitance connected between said intermediate node and said output terminal, said resistance and capacitance forming a low-pass R-C filter; and
   a transconductance amplifier, the inputs of which are connected across said resistance and which produces said second current, said R-C filter arranged to reduce the DC component in said second current that arises due to the inherent resistance of said output inductor.

14. The controller of claim 1, wherein said controller is coupled to said switching circuit and said output inductor so as to form an input voltage feed-forward hysteretic ripple current step-down switching power converter.

15. The controller of claim 1, wherein said controller is coupled to said switching circuit and said output inductor so as to form a constant on-time current mode step-down switching power converter with input voltage feed-forward.

16. The controller of claim 1, wherein said controller is coupled to said switching circuit and said output inductor so as to form a constant frequency step-down switching power converter with slope compensation.

17. The controller of claim 1, wherein said controller is coupled to said switching circuit and said output inductor so as to form a step-up switching power converter.

18. A single integrator sensorless current mode controller for use with a switching power converter which includes a switching circuit that alternatively connects and disconnects an output inductor to and from a source voltage such that said output inductor conducts a current to an output terminal to produce an output voltage $V_{out}$, comprising:
   a first signal processing block which produces an output SENSE1 given by:

$$\text{SENSE1} = (L+ - L-) * K1,$$

where $(L+ - L-)$ is the voltage across said output inductor and $K1$ is a first gain factor;
   a second signal processing block which produces an output SENSE2 given by:

$$\text{SENSE2} = (V_{out} * K2 - V_{ref1}) * K3,$$

where $K2$ and $K3$ are second and third gain factors, respectively, and $V_{ref1}$ is a reference voltage;
   a third signal processing block which produces an output PROP1 given by:

$$\text{PROP1} = \text{SENSE2} * K4,$$

where $K4$ is a fourth gain factor;
   a fourth signal processing block which produces an output INT1 given by:

$$\text{INT1} = \int (\text{SENSE1} + \text{SENSE2});$$

and
   a fifth signal processing block which produces an output CNTRL given by:

$$\text{CNTRL} = \text{INT1} + \text{PROP1} - V_{ref2},$$

where $V_{ref2}$ is a substantially fixed voltage, said CNTRL output arranged to control the operation of said switching circuit.

19. The controller of claim 18, wherein said first signal processing block comprises a transconductance amplifier having a gain K1.

20. The controller of claim 18, wherein said second signal processing block comprises a resistive divider which multiples $V_{out}$ by said gain factor K2, and a transconductance amplifier having a gain K3.

21. The controller of claim 18, wherein said third signal processing block comprises a compensation resistor which multiplies the output SENSE2 of said second signal processing block by said fourth gain factor K4.

22. The controller of claim 18, wherein said fourth signal processing block comprises a single capacitor connected to a summation point at which SENSE1 and SENSE2 are summed.

23. The controller of claim 18, wherein said fifth signal processing block comprises a summation node at which INT1 and PROP1 are summed, and a comparator connected to said summation node at a first input and to said voltage $V_{ref2}$ at a second input.

24. A single integrator sensorless current mode controller for use with a switching power converter which includes a switching circuit that alternatively connects and disconnects an output inductor to and from a source voltage such that said output inductor conducts a current to an output terminal to produce an output voltage $V_{out}$, comprising:

a first signal processing block which produces an output SENSE1 given by:

SENSE1=$(L+-L-)*K1$, where (L+−L−) is the voltage across said output inductor and K1 is a first gain factor;

a second signal processing block which produces an output SENSE2 given by:

SENSE2=$(V_{out}*K2-V_{ref1})*K3$, where K2 and K3 are second and third gain factors, respectively, and $V_{ref1}$ is a reference voltage;

a third signal processing block which produces an output PROP1 given by:

PROP1=SENSE2*$K4$, where K4 is a fourth gain factor;

a fourth signal processing block which produces an output INT1 given by:

INT1=$f$(SENSE1+SENSE2);

and a fifth signal processing block which produces an output CNTRL given by:

CNTRL=$V_{ref2}$−PROP1+$INT1$, where $V_{ref2}$ is a substantially fixed voltage, said CNTRL output arranged to control the operation of said switching circuit.

25. A single integrator sensorless current mode (SCM) controller for use with a hysteretic ripple current mode switching power converter which includes a switching circuit that alternatively connects and disconnects an output inductor to and from a source voltage such that said output inductor conducts a current to an output terminal to produce an output voltage $V_{out}$, said output inductor connected between said output terminal and a switch node, comprising:

an amplifier circuit which produces a first current at a first node that varies with the difference $V_{error}$ between a reference voltage and a voltage which varies proportionally with $V_{out}$;

a resistance connected between said switch node and a second node such that said resistance conducts a second current which varies with the voltage $V_L$ across said output inductor;

a compensation resistance connected between said first and second nodes;

a capacitor connected between said second node and a circuit common node such that it receives said first and second currents and integrates both $V_{error}$ and $V_L$;

a comparator having first and second inputs and producing an output that toggles when the voltage at its first input increases above and falls below the voltage at its second input, said comparator connected to receive the integrated output of said capacitor at its first input;

a resistance connected between said comparator's second input and $V_{out}$; and a switchable current source arranged to provide a fixed current to said comparator's second input when said comparator output toggles due to the voltage at its first input increasing above the voltage at its second input, said comparator output arranged to control the operation of said switching circuit.

26. A method of testing the functionality of a single integrator sensorless current mode (SCM) controller for a switching power converter which includes a switching circuit that alternatively connects and disconnects an output inductor to and from a source voltage such that said output inductor conducts a current to an output terminal to produce an output voltage $V_{out}$, comprising:

providing a single integrator SCM controller comprising:
an amplifier circuit which produces an first current that varies with the difference $V_{error}$ between a reference voltage and a voltage which varies proportionally with $V_{out}$;
a circuit which produces a second current that varies with the voltage $V_L$ across said output inductor;
a single integrating element connected to receive said first and second currents such that it integrates both $V_{error}$ and $V_L$; and
a comparator which receives the integrated output of said single integrating element at its first input and produces an output that toggles when the voltage at its first input increases above and falls below the voltage at its second input, said comparator output arranged to control the operation of said switching circuit; and providing an output inductor for said switching power converter which has a high inductance such that the corresponding inductor current is low when said inductor is alternatively connected and disconnected to and from said source voltage.

* * * * *